(12) United States Patent
Vieyra Villegas et al.

(10) Patent No.: US 11,118,241 B2
(45) Date of Patent: *Sep. 14, 2021

(54) METHOD OF FABRICATING AN ARTICLE FOR MAGNETIC HEAT EXCHANGE

(71) Applicant: Vacuumschmelze GmbH & Co. KG, Hanau (DE)

(72) Inventors: Hugo Abdiel Vieyra Villegas, Hanau (DE); Matthias Katter, Alzenau (DE); Alexander Barcza, Hanau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 88 days.

This patent is subject to a terminal disclaimer.

(21) Appl. No.: 16/557,670

(22) Filed: Aug. 30, 2019

(65) Prior Publication Data

US 2019/0382862 A1    Dec. 19, 2019

Related U.S. Application Data

(62) Division of application No. 15/171,260, filed on Jun. 2, 2016, now Pat. No. 10,472,694.

(30) Foreign Application Priority Data

Jun. 3, 2015    (GB) ..................... 1509618

(51) Int. Cl.
*C21D 9/00* (2006.01)
*H01F 1/01* (2006.01)
*F25B 21/00* (2006.01)

(52) U.S. Cl.
CPC ............ *C21D 9/0068* (2013.01); *F25B 21/00* (2013.01); *H01F 1/015* (2013.01); *F25B 2321/002* (2013.01); *Y02B 30/00* (2013.01)

(58) Field of Classification Search
CPC .... H01F 1/105; F25B 21/00; F25B 2321/002; C21D 9/0068
See application file for complete search history.

(56) References Cited

U.S. PATENT DOCUMENTS 4,814,370 A    3/1989 Kramer et al.
5,179,894 A    1/1993 Hinz et al.
(Continued)

FOREIGN PATENT DOCUMENTS

CN    102189406 A    9/2011
CN    103624491 A    3/2014
(Continued)

OTHER PUBLICATIONS

Combined Search and Examination Report dated Apr. 12, 2016.
Combined Search and Examination Report dated Dec. 1, 2015.
Combined Search and Examination Report dated Dec. 7, 2015.

*Primary Examiner* — Scott R Kastler
(74) *Attorney, Agent, or Firm* — Dickinson Wright PLLC

(57) ABSTRACT

In an embodiment, a method of fabricating a working component for magnetic heat exchange comprises arranging at least two articles comprising a magnetocalorically active phase and an elongated form with a long axis having a length 1 and a shortest axis having a length s, wherein $1 \geq 1.5$ s, such that the shortest axes of the at least two articles are substantially parallel to one another and securing the at least two articles in a position within the working component such that the shortest axes of the at least two articles are substantially parallel to one another within the working component.

17 Claims, 10 Drawing Sheets

(56) References Cited

U.S. PATENT DOCUMENTS

| | | | |
|---|---|---|---|
| 5,676,772 | A | 10/1997 | Kobayashi et al. |
| 6,179,894 | B1 | 1/2001 | Gay |
| 7,063,754 | B2 | 6/2006 | Fukamichi et al. |
| 10,213,834 | B2 * | 2/2019 | Vieyra Villegas ...... H01F 41/00 |
| 10,472,694 | B2 * | 11/2019 | Vieyra Villegas ...... H01F 1/015 |
| 2006/0231163 | A1 | 10/2006 | Hirosawa et al. |
| 2010/0231433 | A1 | 9/2010 | Tishin et al. |
| 2012/0033002 | A1 | 2/2012 | Seeler et al. |
| 2012/0291453 | A1 | 11/2012 | Watanabe et al. |
| 2013/0061602 | A1 | 3/2013 | Kuo et al. |
| 2013/0187077 | A1 | 7/2013 | Katter et al. |

FOREIGN PATENT DOCUMENTS

| | | |
|---|---|---|
| EP | 0663672 A2 | 7/1995 |
| EP | 0870814 A1 | 10/1998 |
| EP | 2636972 A1 | 9/2013 |
| GB | 1076036 A | 7/1967 |
| GB | 2490820 A | 11/2012 |
| JP | H0719790 A | 1/1995 |
| JP | 2013064588 A | 4/2013 |
| WO | 2010128357 A1 | 11/2010 |
| WO | 2011053351 A1 | 5/2011 |
| WO | 2015018705 A1 | 2/2015 |

\* cited by examiner

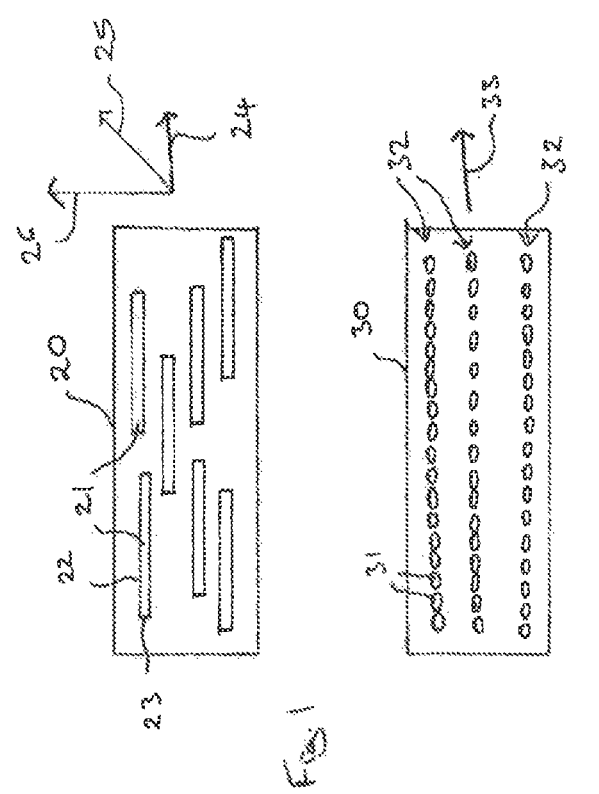

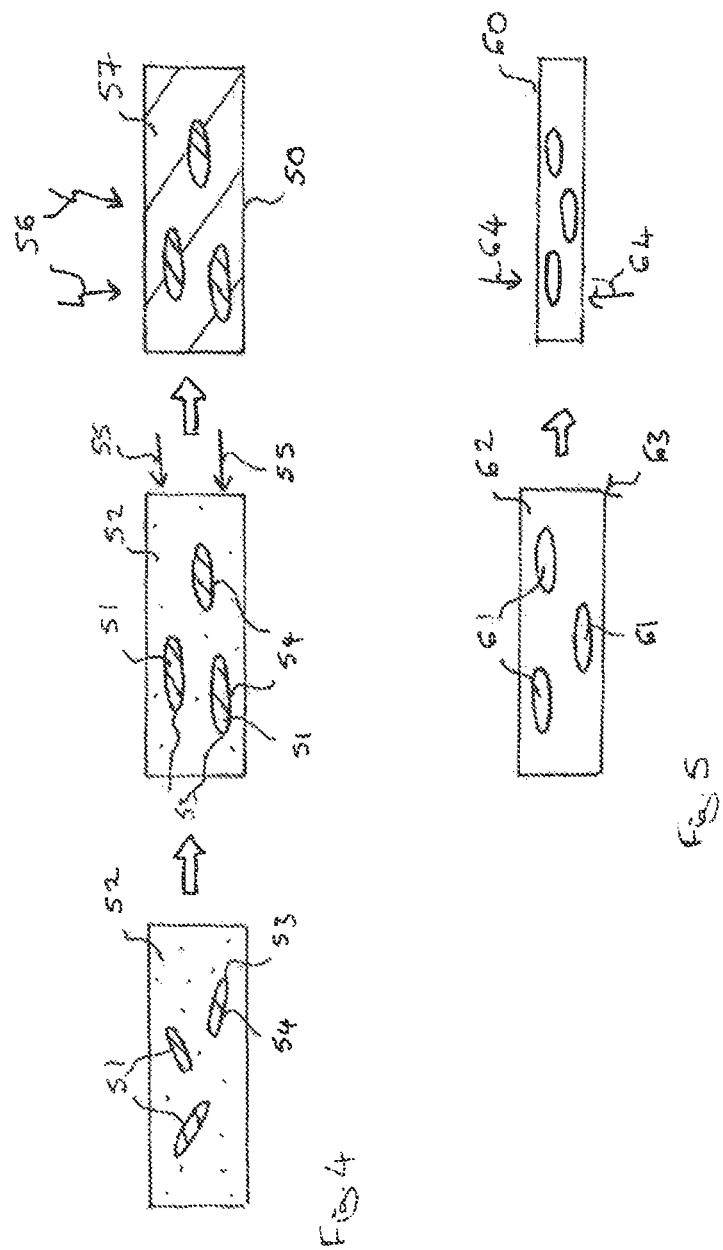

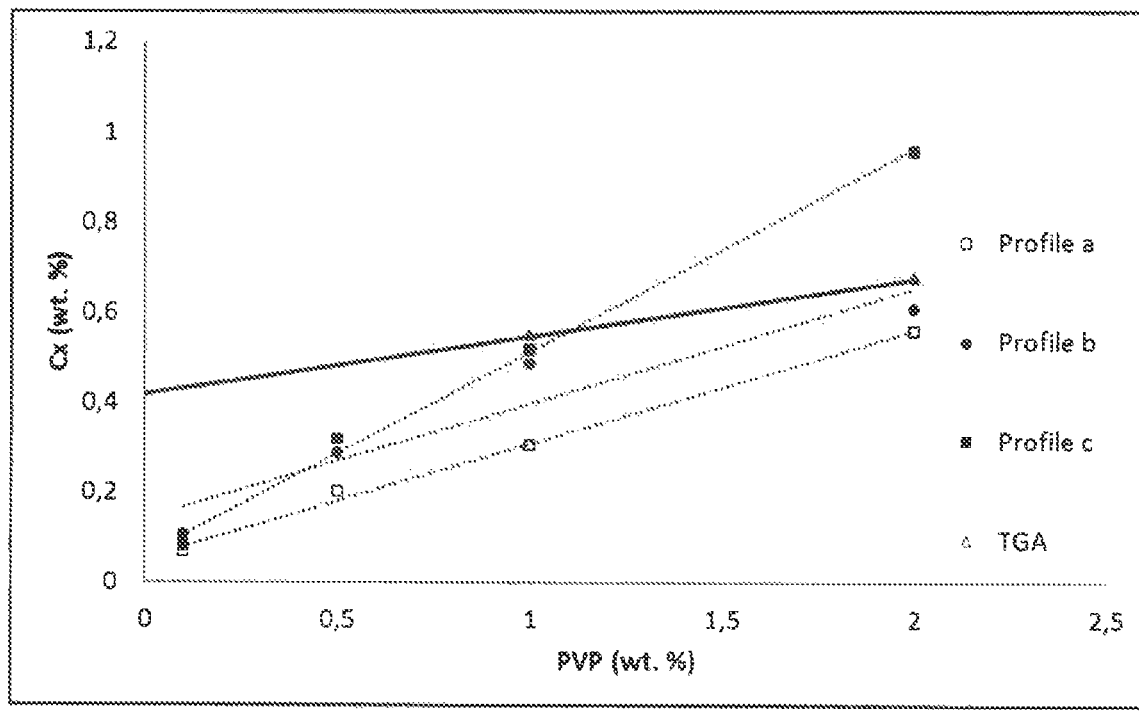
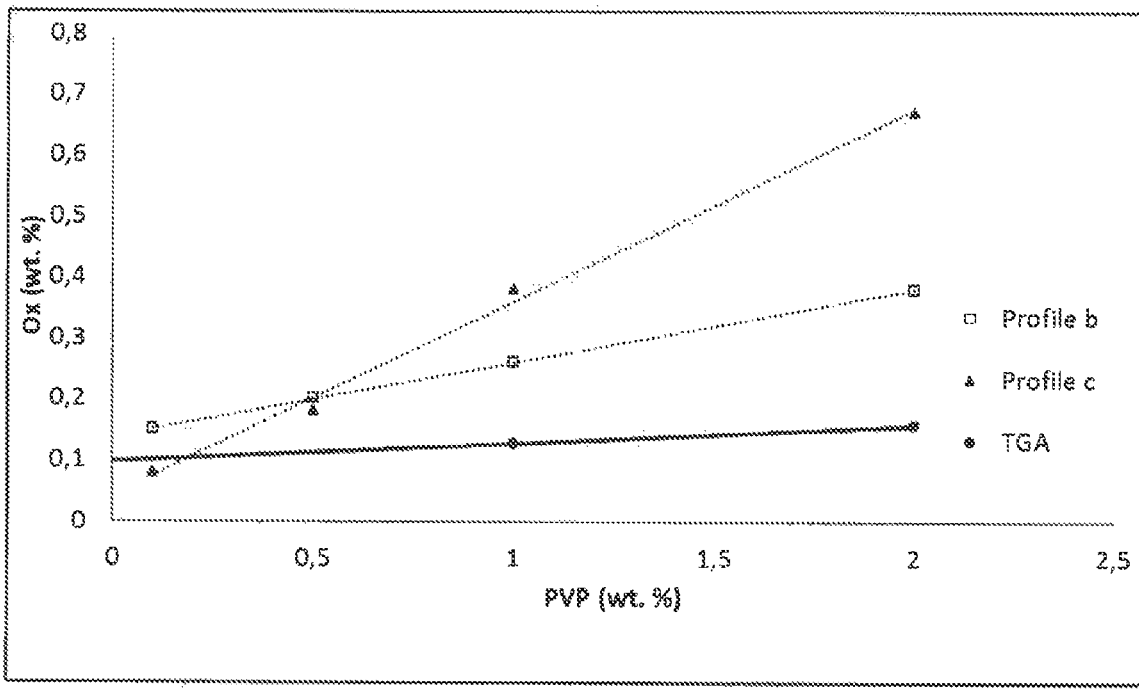
Fig. 7

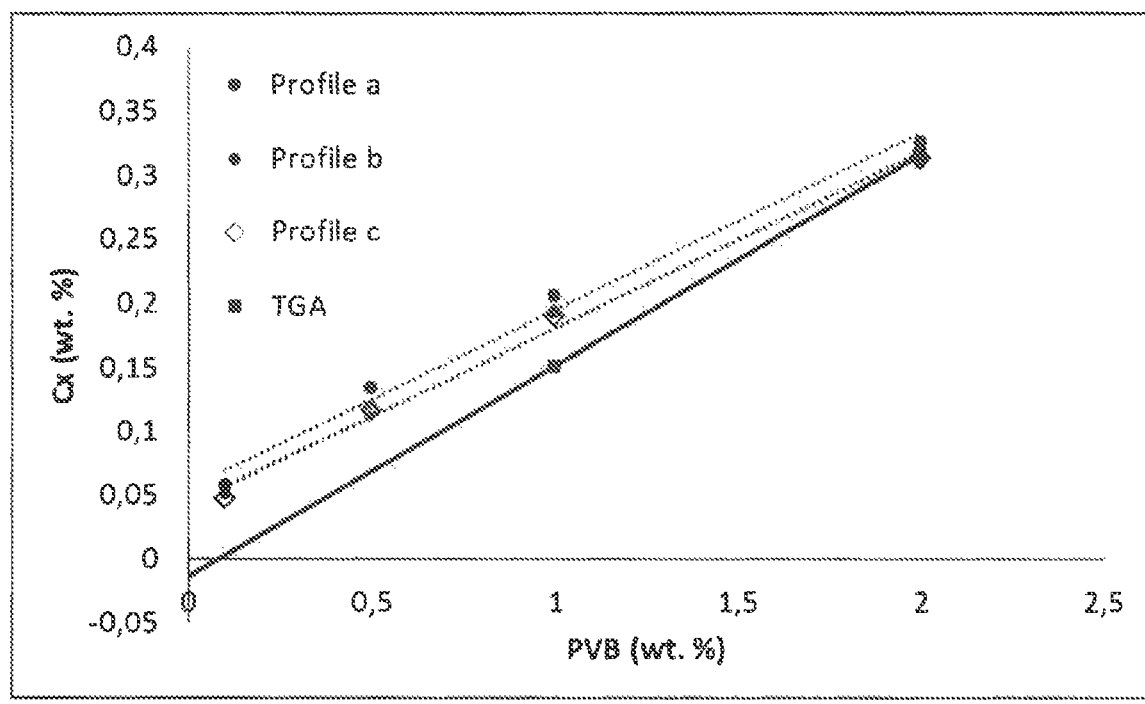
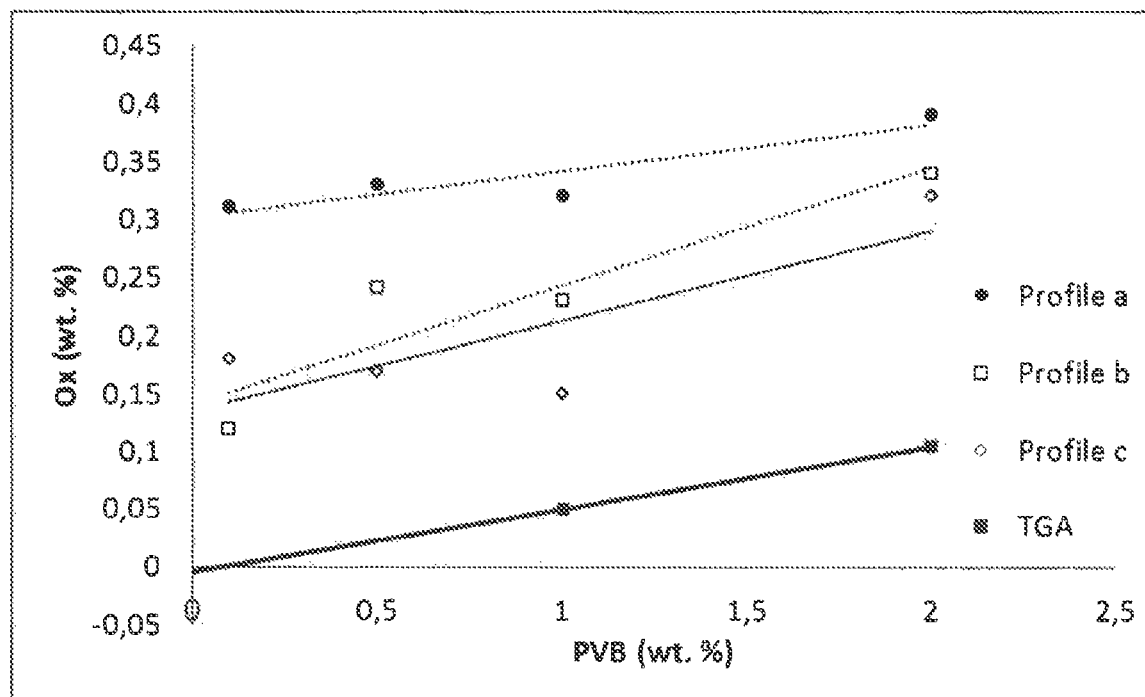
Fig. 8

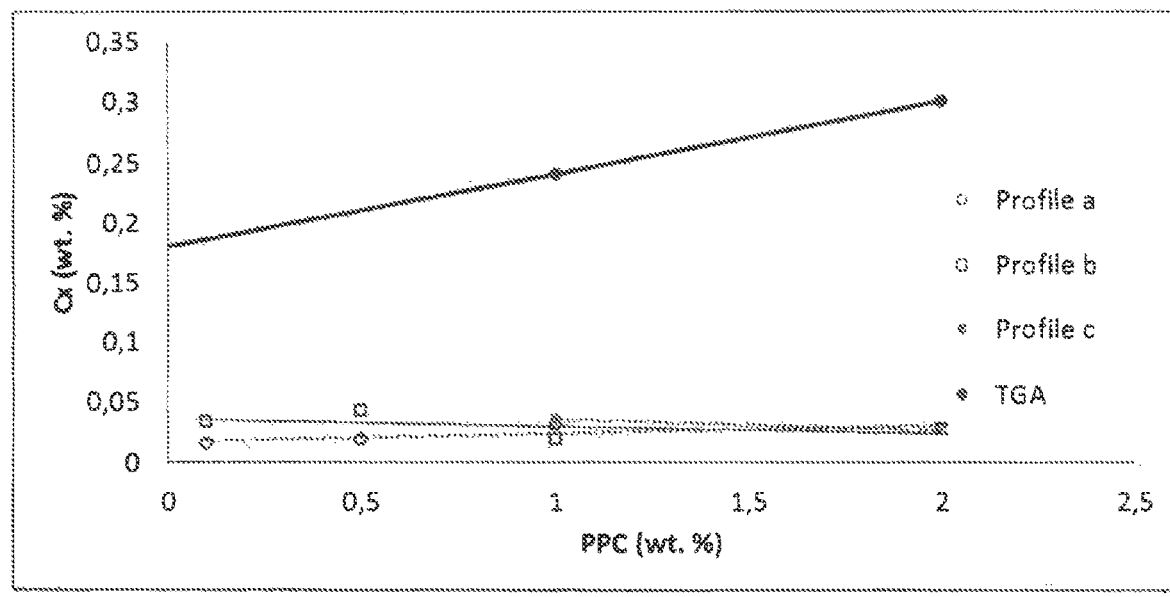
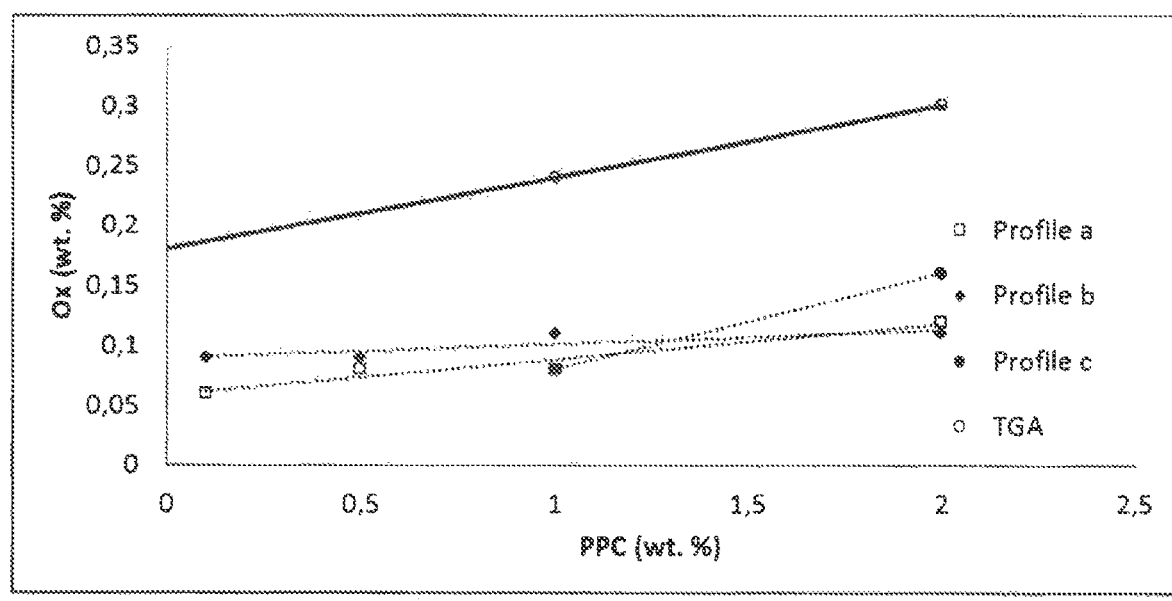
Fig. 9

METHOD OF FABRICATING AN ARTICLE FOR MAGNETIC HEAT EXCHANGE

This U.S. divisional application claims priority to U.S. patent application Ser. No. 15/171,260 filed Jun. 2, 2016, now U.S. Pat. No. 10,472,694, and GB patent application no 1509618.3, filed Jun. 3, 2015, now GB patent no. 2539008, the entire contents of which are incorporated herein by reference.

BACKGROUND

1. Field

This invention relates to methods of fabricating a working component for magnetic heat exchange.

2. Related Art

Practical magnetic heat exchangers, such as that disclosed in U.S. Pat. No. 6,676,772 for example, may include a pumped recirculation system, a heat exchange medium such as a fluid coolant, a chamber packed with particles of a working material which displays the magnetocaloric effect and a means for applying a magnetic field to the chamber. The working material can be said to be magnetocalorically active.

The magnetocaloric effect describes the adiabatic conversion of a magnetically induced entropy change to the evolution or absorption of heat. Therefore, by applying a magnetic field to a magnetocalorically active working material, an entropy change can be induced which results in the evolution or absorption of heat. This effect can be harnessed to provide refrigeration and/or heating.

Magnetic heat exchangers are, in principle, more energy efficient than gas compression/expansion cycle systems. They are also considered environmentally friendly as chemicals such as hydrofluorocarbons (HFC) which are thought to contribute to the depletion of ozone levels are not used.

A variety of magnetocalorically active phases are known which have magnetic phase transition temperatures in a range suitable for providing domestic and commercial air conditioning and refrigeration. One such magnetocalorically active material, disclosed for example in U.S. Pat. No. 7,063,754, has a $NaZn_{13}$-type crystal structure and may be represented by the general formula $La_{1-a}R_a(Fe_{1-x-y}T_yM_x)_{13}H_z$, where M is at least one element of the group consisting of Si and Al, and T may be one or more of transition metal elements such as Co, Ni, Mn and Cr. The magnetic phase transition temperature of this material may be adjusted by adjusting the composition.

In order to provide a practical magnetic heat exchanger, the magnetocalorically active material may be provided in the form of a practical working component. The working component may have the form of particles which are placed in a container or in the form of one or more plates or fins. Plate or fins may be produced by casting from a melt of the magnetocalorically active material or by sintering a compressed powder of the magnetocalorically active material.

However, methods for fabricating working components in practical forms for a magnetic heat exchanger which are cost effective and suitable for use on an industrial scale are desirable to enable a more extensive application of magnetic heat exchange technology.

SUMMARY

In an embodiment, a method of fabricating a working component for magnetic heat exchange comprises arranging at least two articles comprising a magnetocalorically active phase and an elongated form with a long axis having a length l and a shortest axis having a length s, wherein $l \geq 1.5\,s$, such that the shortest axes of the at least two articles are substantially parallel to one another and securing the at least two articles in position within the working component such that the shortest axes of the at least two articles are substantially parallel to one another within the working component.

The articles may have the form of a rod having a circular, square, rectangular, elliptical, or hexagonal cross-section, whereby the length of the rod is at least 1.5 times as long as the shortest dimension of the cross-section. The elongated articles are arranged within the working component such that the shortest axis of the at least two articles are arranged substantially parallel to one another.

Elongate forms including magnetocalorically active material are useful for working components of a magnetic heat exchanger since they can be arranged such that the longer axis or dimension is substantially parallel to the direction of the flow of the coolant and the shortest axis is substantially perpendicular to the direction of flow of coolant. This arrangement reduces turbulence in the coolant flow and increases heat exchange between the working component and the coolant. Consequently, the heat exchange efficiency can be improved.

A magnetocalorically active material is defined herein as a material which undergoes a change in entropy when it is subjected to a magnetic field. The entropy change may be the result of a change from ferromagnetic to paramagnetic behaviour, for example. The magnetocalorically active material may exhibit, in only a part of a temperature region, an inflection point at which the sign of the second derivative of magnetization with respect to an applied magnetic field changes from positive to negative.

A magnetocalorically passive material is defined herein as a material which exhibits no significant change in entropy when it is subjected to a magnetic field.

Examples of magnetocalorically active phases which may be used in the methods described herein are $Gd_5(Si,Ge)_4$, Mn (As,Sb), MnFe (P,Si,Ge,As) and $La_{1-a}R_a(Fe_{1-x-y}T_yM_x)_{13}$.

In use, the working component is arranged with respect to a direction of flow of a heat exchange medium such that the shortest axes of the at least two articles are arranged substantially perpendicularly to the direction of flow of the heat exchange medium.

In some embodiments, the at least two articles have an oblate form, such as an ellipsoid form, and are arranged such that one of the longer axis or dimension is substantially parallel to the direction of the flow of the heat transfer fluid, another of the longer axis or dimension is substantially parallel to the direction of the magnetic field which is applied during the magnetic cooling cycle and the shortest axis is substantially perpendicular to both the direction of flow of the heat transfer fluid and the magnetic field applied during the operation of the working component. This arrangement may be used to reduce the turbulence in the flow of the heat transfer fluid and the demagnetizing field within the individual particles. Both effects may be used to increase the efficiency of the working component.

The at least two articles may each comprise an ellipsoid form. An ellipsoid is a closed quadric surface that is a three-dimensional analogue of an ellipse. The standard equation of an ellipsoid centered at the origin of a Cartesian coordinate system and aligned with the axes is $$\frac{x^2}{a^2} + \frac{y^2}{b^2} + \frac{z^2}{c} = 1$$

The points (a,0,0), (0,b,0) and (0,0,c) lie on the surface and the line segments from the origin to these points are called the semi-principal axes of length a, b, c. They correspond to the semi-major axis and semi-minor axis of the appropriate ellipses.

There are four distinct cases of which one is degenerate: triaxial ellipsoid, whereby a>b>c; oblate ellipsoid of revolution, whereby a=b>c; prolate ellipsoid of revolution, whereby a=b<c; the degenerate case of a sphere in which a=b=c.

In some embodiments, the at least two articles comprise two substantially planar surfaces, and the articles are arranged such that the planar surfaces are substantially parallel to one another. Each of the articles may have a substantially elliptical contour in plan view.

The at least two articles may be arranged using a number of methods. In an embodiment, the at least two articles are aligned by applying a magnetic field. The magnetic field may be axial. In some embodiments, the at least two articles may be aligned by subjecting the articles to a magnetic field rotating in a plane, wherein the plane is aligned with the direction of flow of the heat exchange medium.

In some embodiments, the securing the at least two articles in 30 position within the working component such that the shortest axes of the at least two articles are substantially parallel to one another within the working component comprises applying an adhesive. The adhesive may be applied before the articles are arranged such that the shortest axes of the at least two articles are substantially parallel to one another. The adhesive may be cured after arranging the articles such that the shortest axes of the at least two articles are substantially parallel to one another in order to secure the articles in position within the working component. The adhesive may be dissolved in a solvent into which the at least two articles are placed. After arranging the articles such that the shortest axes are substantially parallel to one another, the solvent may be removed and the remaining adhesive used to secure the articles in position. The removal of the solvent may also be used to create porosity within the working component as the volume occupied by the solvent remains empty.

In some embodiments, a soft solder is applied to the at least two articles. The soft solder may be provided in the form of a powder which is mixed with the articles before they are arranged and secured. The at least two articles may be secured in position by heating to above the melting temperature of the soft solder and cooling to form the working component. Upon solidification of the soft solder, the articles are secured in position such that the shortest axes of the at least two articles are substantially parallel to one another. The soft solder may provide a matrix in which the articles are embedded. The soft solder may provide the mechanical integrity of the working component.

The soft solder may be applied in the form of a suspension of powder in a solvent. The solvent may be removed after the articles have been aligned. This removal of the solvent may be used to produce porosity within the soft solder matrix.

The articles may be secured by performing a sintering heat treatment.

In some embodiments, a packing density of the articles within the working component is increased. The packing density may be increased by pressing the articles and/or heat treating the working component. The heat treating the working component is carried out before the arranging the articles, or after the arranging the articles.

In some embodiments, articles comprising a precursor powder of a magnetocalorically active phase are arranged and secured within the article. The magnetocalorically active phase may be formed from the precursor powder after the articles are arranged and before their position is secured within the working component or after the articles are arranged and after their position is secured within the working component.

In an embodiment, a method of fabricating a working component for magnetic heat exchange comprises providing at least two articles comprising a precursor powder of a magnetocalorically active phase, a binder and an elongated form with a long axis having a length 1 and a shortest axis having a length s, wherein 1≥1.5 s. The at least two articles are arranged such that the shortest axes of the at least two articles are substantially parallel to one another. The articles are secured in position within the working component such that the shortest axes of the at least two articles are substantially parallel to one another within the working component.

The binder may have differing compositions. In an embodiment, the binder comprises a decomposition temperature of less than 300° C., preferably less than 200° C. This assists in the removal 5 of the binder from the mixture to form the green body.

The binder may be selected to avoid undesirable chemical reactions with the magnetocalorically active phase or elements or precursors of the magnetocalorically active phase and/or to reduce the uptake of elements from the binder, for example carbon and/or oxygen into the magnetocalorically active phase which may affect the magnetocaloric properties.

In embodiments in which the precursor powder includes a ferromagnetic material, the articles may be arranged by subjecting the articles to a magnetic field. The magnetic field may be an axial magnetic field or may be caused to rotate in a plane aligned with the direction of flow of the heat exchange medium.

In some embodiments, a temperature of the articles is maintained at a temperature at which at least one component of the article is ferromagnetic.

The at least two articles may be secured in position by pressing the articles whilst applying the magnetic field.

In some embodiments, the method further comprises reactive sintering the at least two articles to form the magnetocalorically active phase from the precursor powder.

The term "reactive sintered" describes an article in which grains are joined to congruent grains by a reactive sintered bond. A reactive sintered bond is produced by heat treating a mixture of differing elements, for example precursor powders of differing compositions. The particles of different compositions chemically react with one another during the reactive sintering process to form the desired end phase or product. The composition of the particles, therefore, changes as a result of the heat treatment. The phase formation process also causes the particles to join together to form a sintered body having mechanical integrity.

Reactive sintering differs from conventional sintering. In conventional sintering, the particles consist of the desired end phase before the sintering process. The conventional sintering process causes a diffusion of atoms between neighbouring particles so as join the particles to one another. The composition of the particles, therefore, remains unaltered as a result of a conventional sintering process. In reactive sintering, the end phase is produced by chemical reaction directly from a mixture of precursor powders of differing composition.

In some embodiments, the method further comprises working the working component to determine the outer dimensions. The working component may be worked by mechanically grinding or polishing one or more outer surfaces of the working component.

In an embodiment, a method of fabricating a working component for magnetic heat exchange is provided which comprises arranging a plurality of articles comprising a magnetocalorically active phase or elements in amounts suitable to produce a magnetocalorically active phase in at least two chains such that a length of the at least two chains is substantially parallel and securing the at least two chains in a position within the working component such that the length of the at least two chains is substantially parallel. The length of the chains may be at least 3 times a breadth of the chains.

In some embodiments, the articles have a substantially spherical form. The length of the chain may be at least 3 times the diameter of the articles. A chain may also be considered to be a row or a column of articles. If the chain includes n substantially spherical articles each having a diameter d, where n is a natural number, the length of the chain may be at least n×d.

If the plurality of articles includes ferromagnetic material, the plurality of articles may be arranged in a chain by applying a magnetic field. The magnetic field may be an axial magnetic field having a direction parallel to the at least two chains, or the magnetic field may be rotated in a plane aligned with the direction of flow of the heat exchange medium.

In some embodiments, a temperature of the articles is maintained at a temperature at which at least one component of the article is ferromagnetic. This enables the component in the ferromagnetic state to be aligned by applying a magnetic field.

The position of the at least two chains may be secured by applying an adhesive to fix the position of the plurality of articles and curing the adhesive. The adhesive may be dissolved in a solvent which is removed after the articles have been arranged. The remaining adhesive may be cured to secure the articles in position.

The position of the at least two chains may be secured by applying a soft solder, for example a soft solder powder. The working component may be heated to above the melting temperature of the solder and cooled to below the melting temperature to form the working component. The soft solder in powder form may be mixed with the articles and the chains formed within the soft solder powder. The soft solder powder may also be mixed with a solvent which is removed before the soft solder is melted and re-solidified. The position of the at least two chains may be secured by performing a sintering heat treatment.

In embodiments, in which the article includes a binder, the article may be fabricated by plastically deforming a composite body comprising a binder having a glass transition temperature TG and a powder comprising a magnetocalorically active phase or elements in amounts suitable to produce a magnetocalorically active phase. The article may be plastically deformed such that at least one dimension of the article changes in length by at least 10%.

The powder is mixed with the binder such that a composite body is formed which is plastically deformable due at least in part to the presence of the binder. The glass transition temperature TG of the binder enables the composite body to be plastically deformed at temperatures above TG, since above the glass transition temperature, the binder is in the glassy form, no longer brittle and consequently plastically deformable.

Plastic deformation describes a permanent change in shape of a solid body without fracture upon the action of a sustained force. Plastically deformable described a material which is capable of undergoing plastic deformation. Plastically deforming describes the act of producing a permanent change in shape of a solid body without fracture upon applying a sustained force.

The article may be subsequently heat treated to remove the binder and to sinter the magnetocalorically active powder to increase the mechanical integrity of the working component. In embodiments, in which the article includes elements in amounts suitable to produce a magnetocalorically active phase, the binder may be removed and these elements or precursors including the elements may be reactively sintered to produce the magnetocalorically active phase and increase the mechanical integrity of the working component.

The article may include a precursor powder of a magnetocalorically active phase which includes elements in amounts suitable to produce a magnetocalorically active phase. The powder including elements in amounts suitable to produce a magnetocalorically active phase may be magnetocalorically passive. The elements may be provided in the form of a mixture of two or more precursor powders of differing composition. The elements may be provided in form of elemental powders or powders comprising alloys of two or more of the elements. The elements may also be provided in the form of precursor powders. For example, oxides, nitrides or hydrides of the elements may be mixed in suitable amounts to provide the elements of the magnetocalorically active phase in the desired stoichiometry.

In some embodiments, the binder may be a poly(alkylene carbonate). The poly(alkylene carbonate) may comprise one of the group consisting of poly(ethylene carbonate), poly(propylene carbonate), poly(butylene carbonate) and poly(cyclohexene carbonate). If poly(propylene carbonate) is used, it may have a relative molecular mass of 13,000 to 350,000, preferably 90,000 to 350,000.

The use of a binder comprising a poly (alkylene carbonate) enables the production of a finished sintered article with a low carbon and oxygen content, since poly(alkylene carbonate) binders may be removed without leaving residues or components of a reaction with the elements of the magnetocalorically active phase. Poly(alkylene carbonate) binders are found to be particularly suitable for use with the $La_{1-a}R_a(Fe_{1-x-y}T_yM_x)_{13}H_zC_b$ magnetocalorically active phase.

The binder to powder ratio may be adjusted. In some embodiments, the mixture comprises 0.1 weight percent to 10 weight percent binder, preferably 0.5 weight percent to 4 weight percent binder. A higher binder content may be used to increase the mechanical stability of the article. The article may also be considered to be a brown body or a composite body.

The binder may be removed by heat treating the article at a temperature of less than 400° C. The heat treating may be carried out in a noble gas atmosphere, a hydrogen-containing atmosphere or under vacuum. The heat treatment may be carried out for 30 min to 20 hours, preferably, 2 hours to 6 hours.

The article may be heat treated under conditions such that at least 90% by weight of the binder, preferably more than 95 weight percent, is removed.

In some embodiments, the method comprises mixing a solvent with the binder and the powder to form a mixture from which a precursor article is formed. In these embodiments, the solvent may then be removed from the precursor article to form the article. The solvent may be removed by drying the precursor article, for example the precursor article may be dried by heat treating the precursor article at a temperature of less than 100° C. under vacuum. The precursor article may be dried by placing the precursor article in a chamber and evacuating the chamber.

The solvent may comprise one of the group consisting of 2,2,4 trimethylpentane (isooctane), isopropanol, 3-methoxy-1-butanol, propylacetate, dimethyl carbonate and methylethylketone. In some embodiments, the binder is poly(propylene carbonate) and the solvent is methylethylketone.

After plastic deformation of the article, the article may be sintered by heat treating at a temperature between 900° C. and 1200° C., preferably, between 1050° C. and 1150° C. in a noble gas, a hydrogen-containing atmosphere and/or under vacuum.

A sequence of differing atmospheres may be used during sintering. In an embodiment, the sintering is carried out for a total sintering time $t_{tot}$. The green body is initially sintered in vacuum for $0.95t_{tot}$ to $0.75t_{tot}$ and subsequently in a noble gas or hydrogen-containing atmosphere for $0.05t_{tot}$ to $0.25t_{tot}$.

The magnetocalorically active phase may be $La_{1-a}R_a(Fe_{1-x-y}T_yM_x)_{13}H_zC_b$, wherein M is Si and, optionally, Al, T is one or more of the elements from the group consisting of Mn, Co, Ni, Ti, V and Cr and R is one or more of the elements from the group consisting of Ce, Nd, Y and Pr, wherein $0 \leq a \leq 0.5$, $0.05 \leq x \leq 0.2$, $0.003 \leq y \leq 0.2$, $0 \leq z \leq 3$ and $0 \leq b \leq 1.5$. In embodiments in which the $La_{1-a}R_a(Fe_{1-x-y}T_yM_x)_{13}H_zC_b$ phase includes one or more of the elements denoted by R, the content may be $0.005 < a < 0.5$. In embodiments in which the $La_{1-a}R_a(Fe_{1-x-y}T_yM_x)_{13}H_z$ phase includes hydrogen, the hydrogen content z may be $1.2 \leq 3$. If hydrogen is present, it is incorporated interstitially within the $NaZn_{13}$ structure of the $La_{1-a}R_a(Fe_{1-x-y}T_yM_x)_{13}H_zC_{b\ phase}$. After sintering or reactive sintering, the working component may be subjected to a further hydrogenation treatment to introduce hydrogen into the $NaZn_{13}$ structure.

In some embodiments, the aligned particles may be secured or their position fixed by a sintering treatment. In a first embodiment this may be sintering of aligned particles which have already been sintered to full density before. In a second embodiment this may sintering of aligned green bodies where the sintering leads to the densification of the particles themselves and to joining them among each other to form the working component. In the second embodiment, the sintering may also be a reactive sintering to form the magnetocalorically active phase from the precursor powder.

BRIEF DESCRIPTION OF THE DRAWINGS

Embodiments and examples will now be described with reference to the drawings and tables.

FIG. 1 illustrates a schematic diagram of a working component for a magnetic heat exchanger.

FIG. 2 illustrates a schematic diagram of a working component of a magnetic heat exchanger.

FIG. 4 illustrates a schematic diagram of a method for fabricating a working component for a magnetic heat exchanger.

FIG. 5 illustrates a schematic diagram of a method of fabricating a working component for a magnetic heat exchanger.

FIG. 7 illustrates graphs of carbon and oxygen uptake for samples after debinding a PVP binder.

FIG. 8 illustrates graphs of carbon and oxygen uptake for samples after debinding a PVB binder.

FIG. 9 illustrates graphs of carbon and oxygen uptake for samples after debinding a PPC binder.

DETAILED DESCRIPTION OF EXAMPLE EMBODIMENTS

Figure 3:
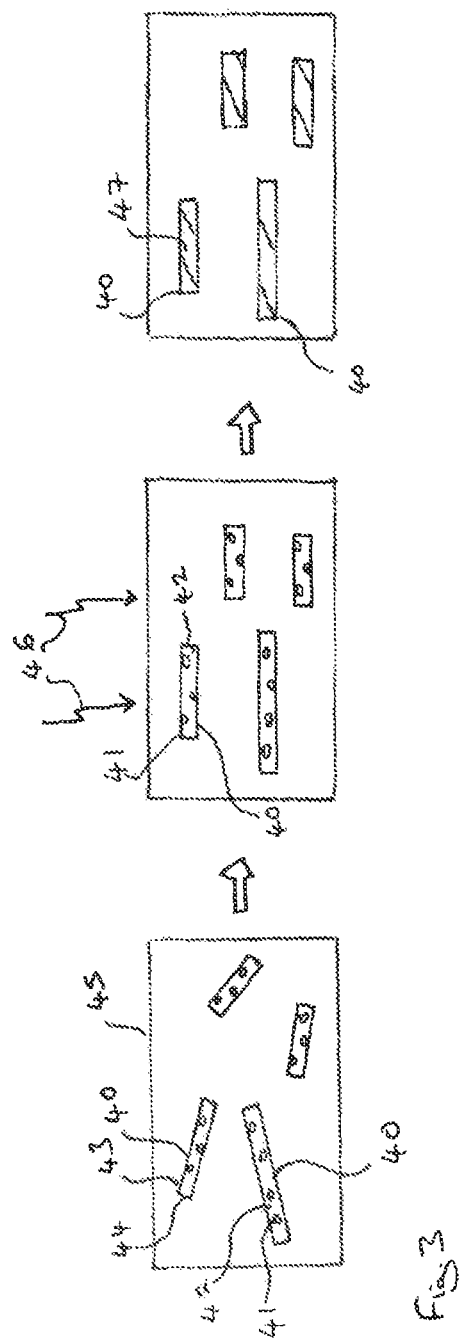
FIG. 3 illustrates a schematic diagram of a method for fabricating a working component for a magnetic heat exchanger.

FIG. 1 illustrates a schematic diagram of a working component 20 for a magnetic heat exchanger. The working component 20 includes a plurality of elongated articles 21 each including a magnetocalorically active phase. The articles 21 have an elongated form with a long axis 22 having a length, 1, and a shortest axis 23 having a length, s, whereby the length, 1, is greater or equal to 1.5 times the length, s. The shortest axes 23 of the articles 21 are substantially parallel to one another. The articles 21 may be arranged in the working component 20 such that the shortest axes 23 are arranged substantially perpendicular to the direction of flow of the heat exchange medium of the magnetic heat exchanger. The flow of the heat exchange medium is indicated in FIG. 1 by the arrow 24. The long axes 22 of the articles 21 are substantially parallel to the direction of flow of the heat exchange medium.

FIG. 2 illustrates a schematic view of a working component 30 for a magnetic heat exchanger. The working component 30 includes a plurality of articles 31 which may be substantially spherical. The substantially spherical articles 31 are arranged in two or more chains 32 having a length which is substantially longer than the width. The orientation of the chains 32 is substantially parallel. The chains 32 may also considered to be rows or columns of substantially spherical articles 31. The chains 32 may be arranged such that their orientation is substantially parallel to the direction of flow of heat exchange medium within the magnetic heat exchanger. The direction of flow of the heat exchange medium is indicated schematically in FIG. 2 by the arrow 33.

The articles 21, 31 may be arranged within the working component 20, 30, respectively, by applying a magnetic field which causes the articles to align such that the shortest axes are substantially parallel to one another and the longest axes are substantially parallel to one another or such that the particles are aligned in chains. The position of the articles 21, 31 may be secured within the working component 20, 30 by applying an adhesive, such as a resin-based adhesive, by use of a soft solder or by sintering.

Elongate forms including ellipsoid forms are useful for working components of a magnetic heat exchanger since they can be arranged such that the longer axis or dimension is substantially parallel to the direction of the flow of the coolant, indicated in FIG. 1 by arrow 24, and the shortest axis is substantially perpendicular to the direction of flow of coolant. This arrangement reduces turbulence in the coolant flow and increases heat exchange between the working component and the coolant.

Oblate forms including ellipsoid forms can be arranged such that one of the longer axis or dimension is substantially parallel to the direction of the flow of the heat transfer fluid, as indicated schematically in FIG. 1 by arrow 24, another of the longer axis or dimension is substantially parallel to the direction of the magnetic field which is applied during the magnetic cooling cycle, as is indicated in FIG. 1 by arrow 25, and the shortest axis is substantially perpendicular to both the direction of flow of the heat transfer fluid and the magnetic field applied during the operation of the working component, as is indicated in FIG. 1 by the arrow 26. This arrangement reduces the turbulence in the flow of the heat transfer fluid and the demagnetizing field within the individual particles. Both effects may be used to increase the efficiency of the working component.

FIG. 3 illustrates a schematic diagram of a method for fabricating a working component for a magnetic heat exchanger. The least two articles 40 are provided which include a precursor powder 41 of the magnetocalorically active phase and a binder 42. The articles have an elongated form having a long axis 43 having a length 1 and a shortest axis 44 having a length s. The long axis 1 is at least one half times larger than the shortest axis s. The at least two articles are placed in a container or form 45 and arranged such that the shortest axes 44 of the at least two articles 40 are substantially par-allel to one another.

The articles 40 do not initially include a magnetocalorically active phase. The magnetocalorically active phase may be formed by reactive sintering the precursor powder, as is illustrated schematically in FIG. 3 by the arrows 46. The binder may first be removed from the articles 41 and subsequently a reactive sintering treatment carried out to form the magnetocalorically active phase 47.

The sintering treatment may be also used to join the aligned particles to each other to form a solid working component with continuous fluid channels which are aligned parallel to the direction of flow of the heat transfer fluid.

The articles 41 may be aligned by applying a magnetic field, if the precursor powder includes ferromagnetic material. In some embodiments, the temperature of the articles 41 is adjusted such that the articles are maintained at a temperature at which at least one component of the article is ferromagnetic. This enables the articles to be aligned using magnetic force. In some embodiments, the articles 41 are aligned by pressing or a combination of pressing whilst applying a magnetic field may be used to align the articles such that their shortest axes are substantially parallel to one another.

FIG. 4 illustrates a method for fabricating a working component 50 for magnetic heat exchange. A plurality of articles 51 including a magnetocalorically active phase is provided. Each of the articles 51 has an elongate form. In this embodiment, the articles 51 have an ellipsoid form the articles 51 may be mixed with a soft solder powder 52 and a solvent. The articles 51 are arranged such that the shortest axes 53 are substantially parallel to one another and the longest axis 54 are substantially parallel to one another. The articles 51 may be aligned by pressing and rolling or by application of a magnetic field as is indicated schematically in FIG. 4 by the arrow 55. After the articles 51 have been arranged, the solvent is removed and the articles 51 are secured in positioned within the working component 50 by heat treating at a temperature which is higher than the melting point of the soft solder 52. The heat treatment is indicated schematically in FIG. 4 by the arrows 56. The soft solder 52 melts producing a matrix 57 in which the articles 51 are embedded. Due to the reduced packing density of articles 51 and the removed solvent the matrix contains continuous fluid channels which are substantially parallel to the direction of flow of the heat transfer fluid. Upon cooling below the melting point of the soft solder 52, the soft solder 52 solidifies to produce the working component 50.

FIG. 5 illustrates a schematic diagram of a method for fabricating a working component 60 for a magnetic heat exchanger. A plurality of articles 61 is provided which each include a magnetocalorically active phase and an elongate form. The article 61 may have an ellipsoid form. The articles 61 may be arranged in the matrix 62 such that the shortest axes of the articles 61 are substantially parallel to one another. This intermediate product 63 may be mechanically deformed, for example by pressing, as is schematically indicated by the arrows 64, to increase the packing density of the articles 61 within the intermediate product 63. A further heat treatment may be carried out to secure the position of the articles 61 within the working component 60. In some embodiments, the position of the articles 61 may be secured by applying an adhesive which is then cured to provide a resin matrix for working component 60. In other embodiments, the position of the articles 61 may be secured by sintering the articles 61 to produce a working component with mechanical integrity.

The working components may have an open porosity of 20% to 90%, preferably of 30% to 50%. The smallest dimension of the 25 articles may be 50 µm to 1000 µm, preferably 100 µm to 500 µm.

The articles may be mixed with a solvent in which the adhesive is dissolved. After the articles have been arranged, the solvent may be removed such that the adhesive remains to secure the articles in the desired position. Use of a solvent, which is subsequently removed, may also be used to assist in adjusting the porosity of the working component.

The articles may also be secured in position in the working component by subjecting the intermediate product to a sintering heat treatment. The sintering heat treatment may be carried out under conditions such that a liquid phase is formed which upon solidification provides the mechanical integrity for the working component.

The article may be fabricated from a composite body including a precursor powder or powder including a magnetocalorically active phase and a binder. The composite body may be fabricated by mixing a binder and a solvent with a powder comprising a magnetocalorically active phase.

The binder may comprise a poly(alkylene carbonate), for example poly(ethylene carbonate), poly(propylene carbonate), poly(butylene carbonate) or poly(cyclohexene carbonate). The solvent may comprise 2,2,4-Trimethylpentane, isopropanol, 3 Methoxy-1-butanol, propylacetate, dimethyl carbonate or methylethylketone. The magnetocalorically active phase may be $La_{1-a}R_a(Fe_{1-x-y}T_yM_x)_{13}H_zC_b$, wherein M is Si and, optionally, Al, T is one or more of the elements from the group consisting of Mn, Co, Ni, Ti, V and Cr and R is one or more of the elements from the group consisting of Ce, Nd, Y and Pr, wherein $0 \leq a \leq 0.5$, $0.05 \leq x \leq 0.2$, $0.003 \leq y \leq 0.2$, $0 \leq z \leq 3$ and $0 \leq b \leq 1.5$.

In one particular embodiment, the binder is poly(propylene carbonate) and the solvent is methylethylketone. These compositions of the binder and solvent are found to be suitable for the $La_{1-a}R_a(Fe_{1-x-y}T_yM_x)_{13}H_zC_b$ phase, since they can be removed from powder including this phase leaving an acceptably low residual carbon and oxygen content. Around 0.1% weight percent to 10 weight percent, preferably 0.5 weight percent to 4 weight percent of binder may be added to the powder.

The mixture of the binder, solvent and powder including a magnetocalorically active phase or a precursor powder mixture capable to form a magnetocalorically active phase after reactive sintering may be further processed by removing some or substantially all of the solvent to form a brown body which includes the powder and the binder. The brown body may be plastically deformed to change its shape at temperatures above the glass transition temperature of the binder. The binder may then be removed from the composite body to produce a green body. The green body may then be reactive sintered to produce an article for magnetic heat exchange.

The binder may be removed by heat treating the composite body at a temperature of less than 400° C. in a noble gas atmosphere, a hydrogen containing atmosphere or under vacuum for a period of around 30 min to 20 hours. Preferably, the conditions are selected such that at least 90% by weight or 95% by weight of the binder 10 is removed.

The green body may be sintered at a temperature between 900° C. and 1200° C. in a noble gas atmosphere, a hydrogen containing atmosphere or under vacuum or a combination of these, if the composite body and green body include the magnetocalorically active phase. If the composite body and the green body include elements suitable for forming the magnetocalorically active phase, i e. precursors which are magnetocalorically passive, the green body may be reactive sintered to form the magnetocalorically active phase from the elements or precursors.

In some embodiments, the article may have the form of a granule which is substantially spherical. Granules may be formed by fluidized bed granulisation.

The binder and the treatment for its removal from the composite body may be selected so as to avoid detrimentally affecting the magnetocaloric properties of the working component.

The suitability of different binders for $La_{1-a}R_a(Fe_{1-x-y}T_yM_x)_{13}H_zC_b$, is investigated. The binders polyvinylpyrrolidone (PVP), poly-vinylbutyral (PVB) and polypropylene carbonate (PPC) are investigated. Samples are made using 0.1, 0.5, 1 and 2 weight percent binder (related to the powder), around 40 g of powder and 20 g of solvent. For PVP and PVB, isopropanol is used as a solvent and for PPC, methylethylketone (MEK) is used as the solvent. The mixtures were in each case mixed for 30 minutes in the turbula mixer and dried at 70° C. for 14 hours under vacuum.

Figure 6:
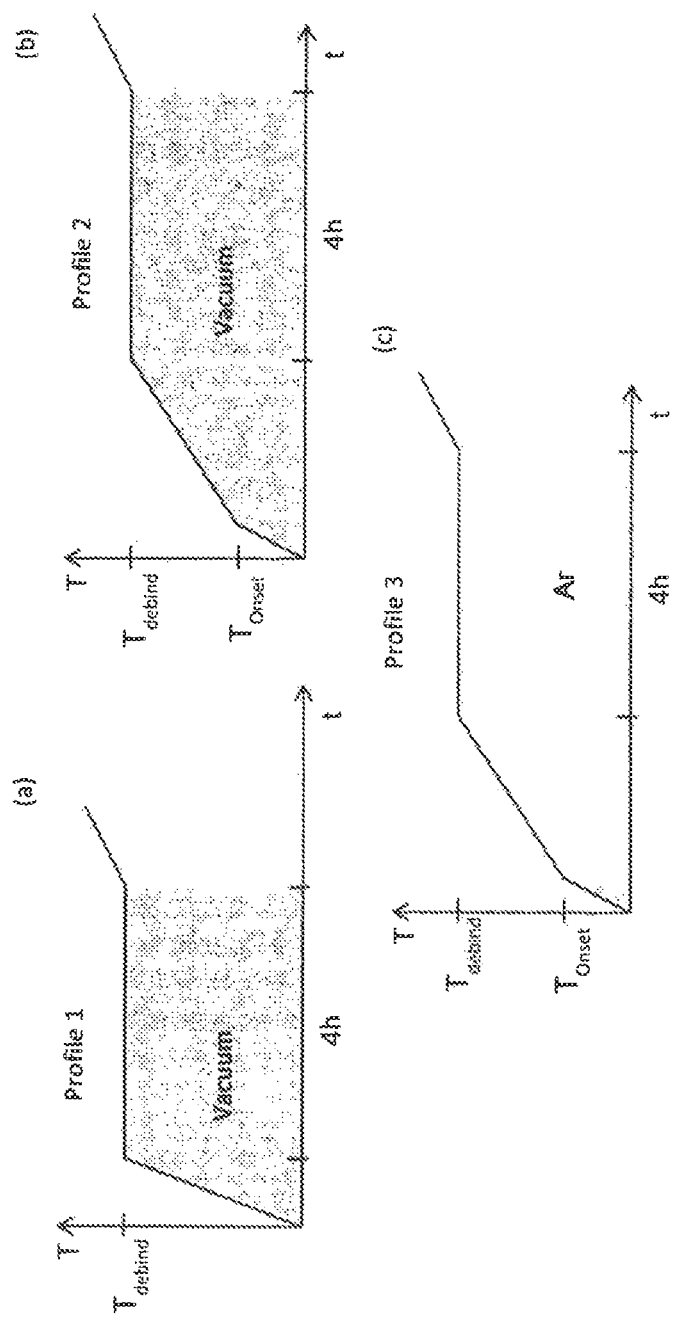
FIG. 6 illustrates three differing debinding heat treatment profiles.

FIG. 6 illustrates three types of heat treatment for removing the binder or debinding. In heat treatment 1, the debinding was carried out under vacuum using a constant heating rate to the debinding temperature $T_{debind}$ which was held for four hours. The heating rate is variable between 2° C. per minute and 4° C. per minute. For the second debinding heat treatment, slower heating rates were used. In a first step, sample was heated at around 3° C. per minute to a first temperature $T_{onset}$ then the heating rate was slowed to around 0.5 to 1° C. per minute from $T_{onset}$ to the debinding temperature $T_{debind}$ which was held for 4 hours. The second debinding treatment was also carried out in vacuum.

The third debinding heat treatment uses the same heat treatment profile as the second debinding treatment. However, after reaching the temperature $T_{onset}$, the vacuum is replaced by 1300 mbar argon.

After the debinding treatment, the samples are sintered by heating from the debinding temperature to the sinter temperature in 7 hours under vacuum, held at the sintering temperature for 3 hours, the atmosphere changed to argon and the sample held at the sintering temperature for further 1 hour in argon. A further homogenization heat treatment at 1050° C. for 4 hours in argon is used and the samples cooled quickly to room temperature using compressed air.

FIG. 7 illustrates the carbon uptake and oxygen uptake measured for samples mixed with PVP after the three debinding heat treatments. Values obtained using thermogravimetric analysis (TGA) in nitrogen are included as a comparison. The debinding temperature $T_{debind}$ is 460° C. and $T_{onset}$ is 320° C. The debinding treatments carried out entirely under vacuum, that is debinding heat treatments 1 and 2, result in a lower level of increase in carbon than under nitrogen, as is indicated by TGA comparison values illustrated in FIG. 7. The debinding treatment 1 results in the lowest increase in the carbon contents. However, the debinding treatments carried out entirely under vacuum, that is debinding heat treatments 1 and 2, result in a higher level of increase in oxygen than under nitrogen, as is indicated by TGA comparison values illustrated in FIG. 7.

FIG. 8 illustrates the carbon uptake and oxygen uptake measured from samples mixed with PVB after use of each of the three debinding treatments. The debinding temperature 7—debind is 400° C. and $T_{onset}$ is 200° C. The use of a PVB binder results in an increase in the carbon content of around 0.3 weight percent and an increase in the oxygen content of around 0.3 weight percent for a binder amount of 2 weight percent. The uptake of carbon and oxygen for PVB is lower compared to PVP. However, about 30% of the binder remains in the final sintered product which may affect the magnetocaloric properties of the material.

FIG. 9 illustrates a graph of the carbon uptake and oxygen uptake as function of weight percent of PPC binder for samples given each of the three debinding heat treatments. The debinding temperature is 300° C. and $T_{onset}$ is 100° C. The carbon uptakes for the samples after the debinding treatment is much lower than the TGA values for each of the three debinding heat treatments and it is also much lower compared to PVP and PVB. Also the oxygen uptake is lower than the TGA values for each of the three debinding heat treatments and it is also lower compared to PVP and PVB.

The carbon uptake and oxygen uptake after the three debinding treatments are summarized in table 1.

TABLE 1

|  | PVP | PVB | PPC |
| --- | --- | --- | --- |
| Density (mean value) | 5.99 g/cm³ | 6.70 g/cm3 | 6.72 g/cm3 |
| Preferred debinding atmosphere | Vacuum | Vacuum or Argon | Vacuum or Argon |
| Preferred debinding profile | Profile 1 | Profile 2/Profile 3 | Profile 1 |
| $C_x$ | (0.25*PVP + 0.06) wt. % | (0.135*PVB + 0.045) wt. % | (0.0106*PPC + 0.0153) wt. % |
| $O_x$ | (0.12*PVP + 0.138) wt. % | (0.10*PVB + 0.14) wt. % | (0.0273*PPC + 0.0599) wt. % |
| Compatibility with LaFeSi | Low | Medium | very high |

In summary, PPC is a particular suitable binder for the $La_{1-a}R_a(Fe_{1-x-y}T_yM_x)_{13}H_zC_b$, phase since the increase in carbon and oxygen after the debinding treatment is lowest for the three binders investigated.

As discussed above, the mixture of the powder, the binder and solvent may be mechanically formed before removal of solvent, for example by casting or screen printing, or after removal of some or substantially all of the solvent by methods such as extrusion or calendaring of the brown body. In some embodiments, spherical granulates or granules are useful for use in the working component of a magnetic heat exchanger. In some embodiments, the granules including particles of the powder and a binder are plastically deformed, before a subsequent debinding and sintering or reactive sintering treatments.

Figure 10:
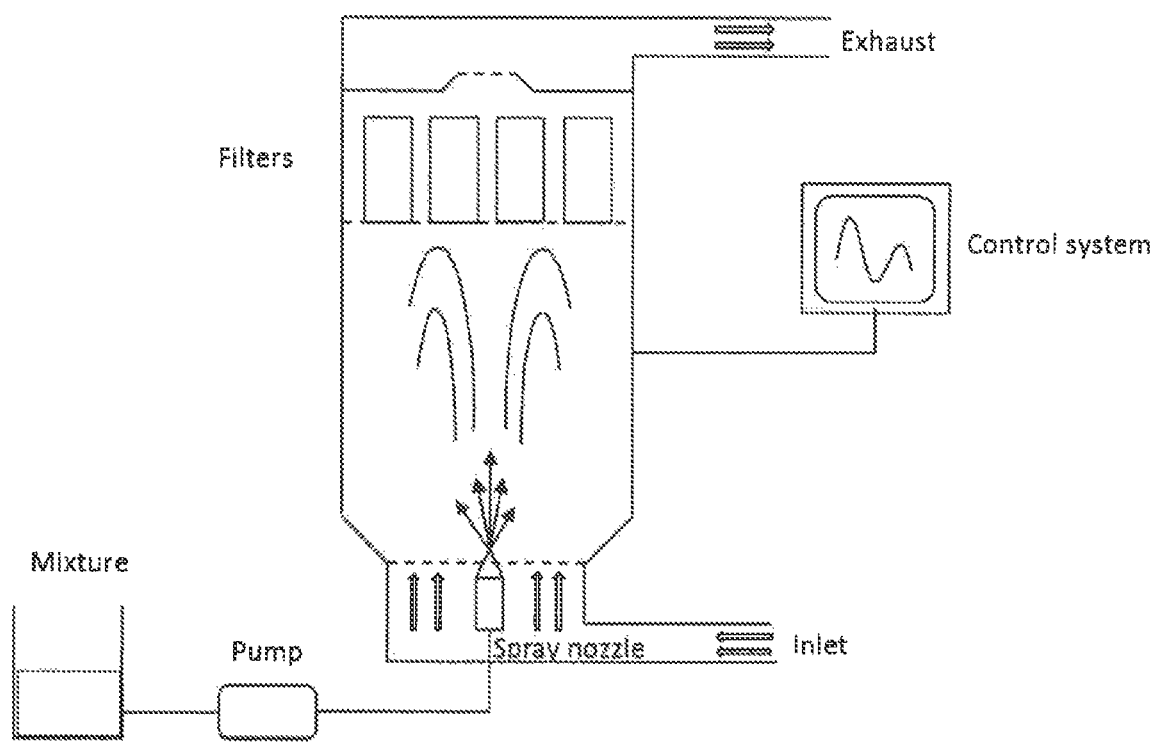
FIG. 10 illustrates a schematic diagram of apparatus for fluidized bed granulisation.

In some embodiments, the spherical or substantially spherical granules may be made using fluidized bed granualisation. FIG. 10 illustrates apparatus for fluidized bed granualisation.

In the fluidized bed granulisation method, powder including the magnetocalorically active phase or precursors thereof or elements in amounts suitable to produce a magnetocalorically active phase is caused to circulate by application of a gas and a fluid, such as a suitable solvent, is sprayed into the moving particles to create the granules. A binder may be added to form stable granules. As discussed above, PPC and methylethylketone is a combination of binder and solvent which is suitable for the $La_{1-a}R_a(Fe_{1-x-y}T_yM_x)_{13}H_zC_b$ phase. The gas temperature and pressure may be and speed may be adjusted to adjust the size of the granules formed.

Conditions suitable for fabricating the granules using fluidized bed granulisation are summarized in table 2.

TABLE 2

| Parameter | Value |
|---|---|
| Starting material | 200 g powder (<315 urn) or granules (<400 µm) |
| Binder | 2 wt. % PPC |
| Suspension | 60 wt. % LaFeSi, 40 wt. % MEK |
| Gas flow | 13 m3/h |
| Temperature | 45° C. |
| Spraying rate | 29 g/min |
| Spraying pressure | 1.5 bar |
| Purging pressure | 2 bar |

The nominal compositions of the powder in weight percent are summarized in table 3.

TABLE 3

| Charge | SE | Si | La | Co | Mn | C | 0 | N | Fe |
|---|---|---|---|---|---|---|---|---|---|
| MFP-1384 | 17.86 | 4.13 | 17.85 | 0.09 | 1.84 | 0.015 | 0.31 | 0.025 | 75.73 |
| MFP-1385 | 17.82 | 4.12 | 17.81 | 0.1 | 1.65 | 0.015 | 0.3 | 0.024 | 75.96 |
| MFP-1386 | 17.78 | 4.09 | 17.77 | 0.11 | 1.47 | 0.015 | 0.3 | 0.023 | 76.21 |

For each powder, three runs in the fluidized bed granulisation apparatus were performed. In run 1, the binder containing material is used as the starting material. In run 2, granules with a diameter of less than 400 µm obtained from run 1 are mixed with fine powder from the filter and used as the starting powder. In run 3, granules with a diameter less than 400 µm obtained from run 2 are mixed with fine powder from the filter and used as starting material.

The results are summarized in table 4.

TABLE 4

|  | 1384 Run 1 | 1384 Run 2 | 1384 Run 3 | 1385 Run 1 | 1385 Run 2 | 1385 Run 3 | 1386 Run 1 | 1386 Run 2 | 1386 Run 3 |
|---|---|---|---|---|---|---|---|---|---|
| Sprayed material | 761 g | 487 g | 405 g | 911 g | 515 g | 679 g | 757 g | 653 g | 468 g |
| Starting material | 230 g | 200 g | 200 g | 80 g | 200 g | 200 g | 200 g | 200 g | 200 g |
| Fraction < 400 µm | 113 g | 62 g | 72 g | 17 g | 7 g | 33 g | 95 g | 97 g | 24 g |
| Fraction 400-630 µm | 210 g | 298 g | 133 g | 71 g | 34 g | 23 g | 133 g | 242 g | 90 g |
| Fraction > 630 µm | 829 | 8 g | 31 g | 372 g | 210 g | 243 g | 248 g | 88 g | 1 g |
| Yield | ~41% | ~53% | ~39% | ~46% | ~35% | ~34% | ~49% | ~50% | ~17% |
| Filter powder | 585 g | 318 g | 369 g | 530 g | 462 g | 580 g | 480 g | 425 g | 551 g |

The granules fabricated by fluidized bed granulisation are subjected to a debinding heat treatment and then sintered to form an article comprising magnetocalorically active material for use in magnetic heat exchange. The magnetocaloric properties of the sintered samples are tested to determine if the use of a binder and solvent and the use of fluidized bed granulation affect the magnetocaloric properties.

The granules are packed in iron foil and gettered before the debinding and sintering heat treatments. The debinding temperature is 300° C. and the sinter temperature is 1120° C. The granules are heated under vacuum in 1 IA hours to the debinding temperature and held that the debinding temperature 300° C. for 4 hours. Afterwards, the temperature is raised in 7 hours under vacuum to the sintering temperature, held for 3 hours at the sintering temperature under vacuum and additionally for one hour at the sintering temperature in argon. Afterwards the granules are cooled to 1050° C. in 4 hours and held at 1050° C. for 4 hours under argon to homogenize the samples. The samples are then cooled quickly under compressed air to room temperature.

The samples were found to have a carbon uptake of 0.04 weight percent to 0.06 weight percent and an oxygen uptake of 0.15% to 0.3 weight percent. These values correspond substantially to those obtained during the investigation of suitable binders.

The sintered granules are hydrogenated by heating the granules in 2 hours under argon to 500° C. and held for one hour at 500° C. Afterwards, the atmosphere is changed to hydrogen and the samples cooled to room temperature in 8 hours and held under hydrogen for 24 hours. The granules are not found to dis-integrate after the hydrogenation treatment.

Figure 11:
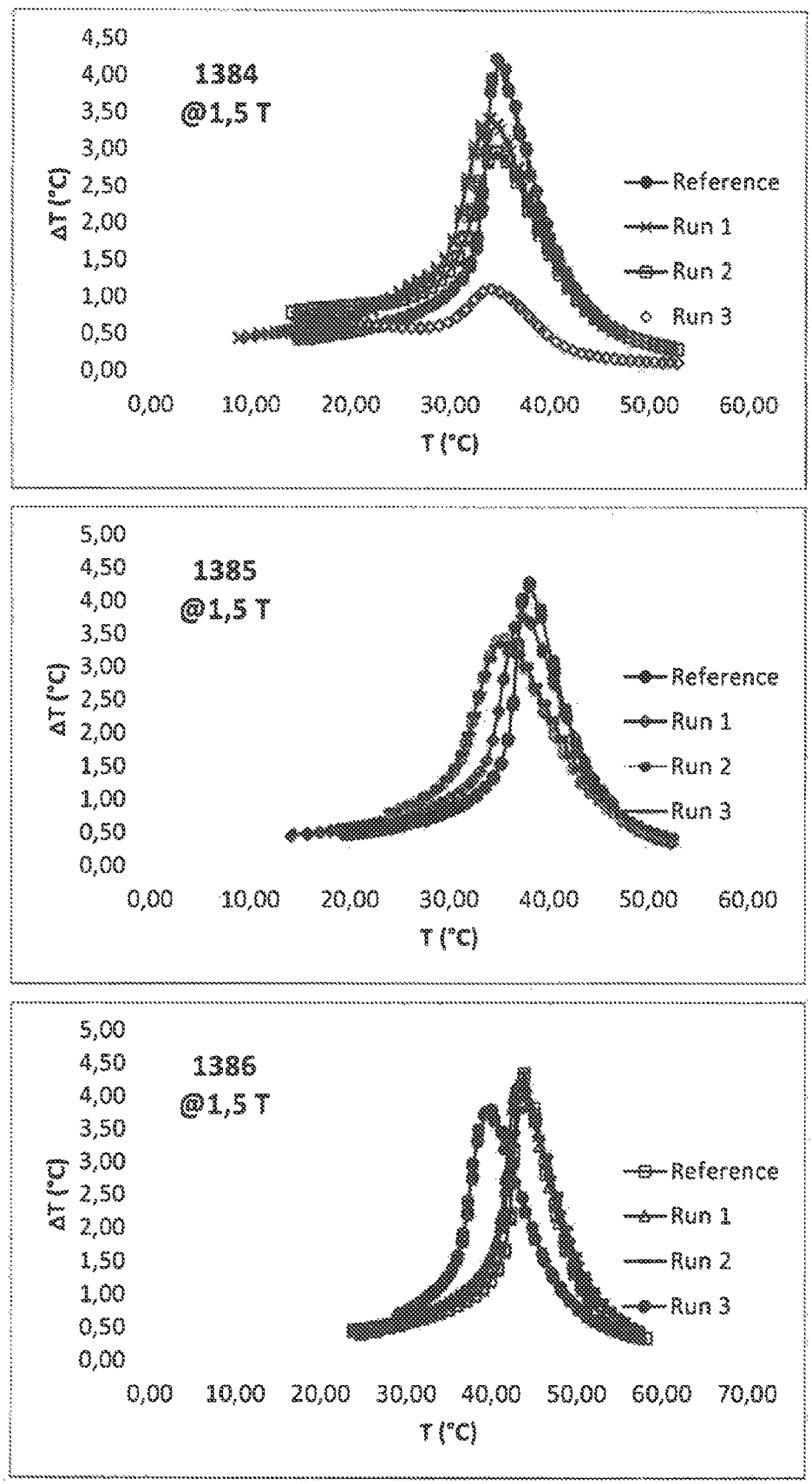
FIG. 11 illustrates graphs of the adiabatic temperature change of sintered samples fabricated using fluidized bed granulisation.
Figure 12:
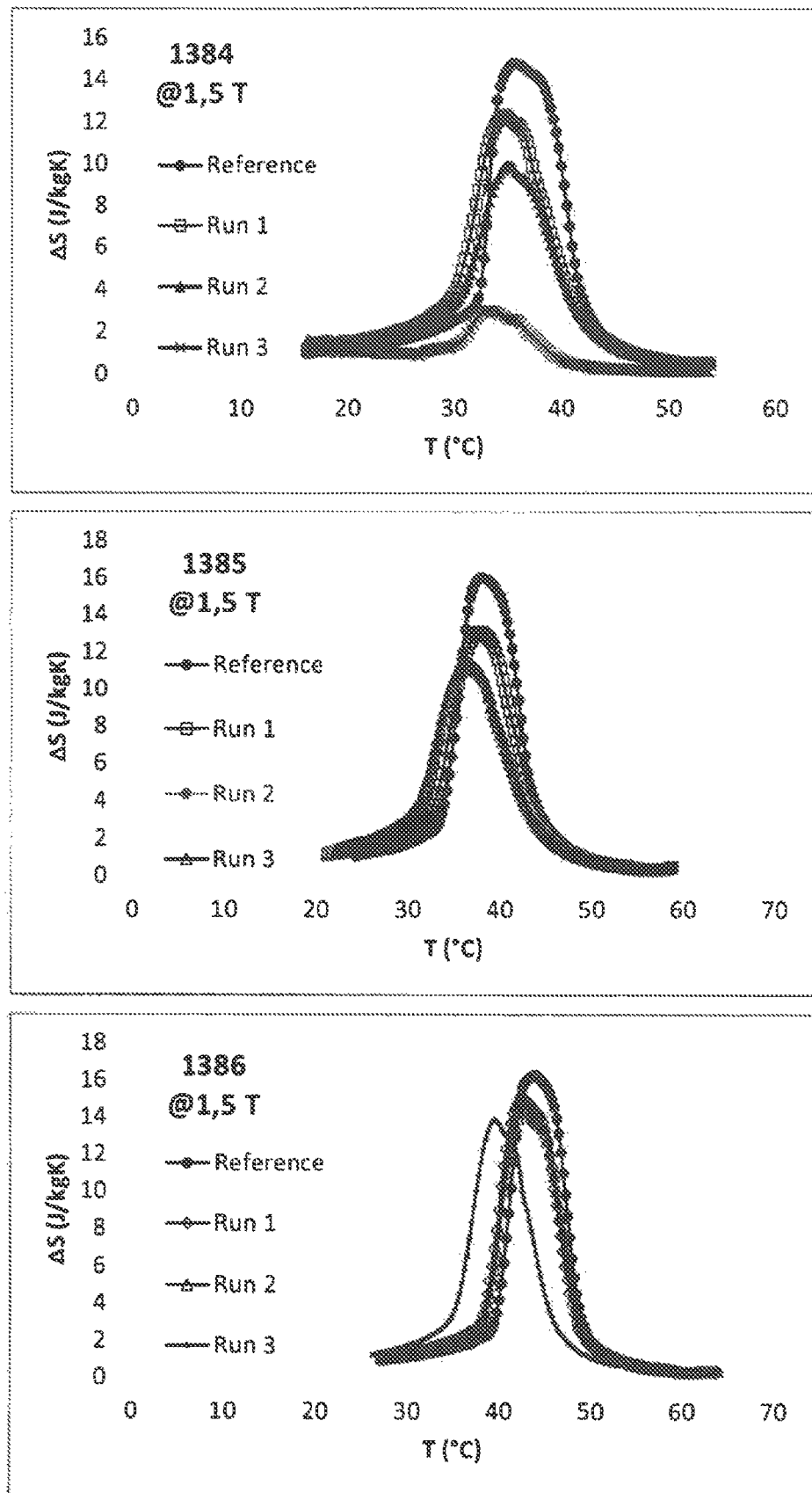
FIG. 12 illustrates graphs of entropy change of sintered samples fabricated using fluidized bed granulisation.

The magnetocaloric properties of the samples are investigated. FIG. 11 illustrates the diagrams of the adiabatic temperature change and FIG. 12 illustrates diagrams of the entropy change for the samples. The results are also summarized in table 5.

TABLE 5

| @ 1.5T | 1384 Run 1 | 1384 Run 2 | 1384 Run 3 | 1385 Run 1 | 1385 Run 2 | 1385 Run 3 | 1386 Run 1 | 1386 Run 2 | 1386 Run 3 |
|---|---|---|---|---|---|---|---|---|---|
| $\rho$ (g/cm$^3$) | 6.81 | 6.59 | 6.92 | 6.91 | 6.8 | 6.45 | 6.94 | 6.99 | 7.07 |
| Nominal T$_c$ (° C.) | | 30 | | | 35 | | | 40 | |
| T$_{Peak}$ (° C.) | 34.9 | 35.4 | 34.2 | 38.5 | 36.4 | 36.6 | 44.4 | 44.9 | 40.8 |
| ΔT (° C.) | 3.4 | 2.9 | 1.3 | 3.7 | 3.4 | 3.3 | 4.2 | 3.8 | 3.7 |
| ΔT Ref. (° C.) | | 4.32 | | | 4.36 | | | 4.35 | |
| ΔS (J/KgK) | 12.2 | 9.8 | 2.9 | 13 | 11 | 11.3 | 14.9 | 14.3 | 13.7 |
| ΔS Ref. (J/KgK) | | 14.7 | | | 15.9 | | | 16.2 | |
| T$_{Peak}$ (° C.) | 35 | 35.4 | 33.9 | 37.8 | 36.6 | 36.5 | 42.9 | 43.3 | 40 |
| α-$^{Fe}$ (wt. %) | 3.7 | 4.7 | 5.4 | 3.8 | 3.3 | 3.8 | 6.2 | 4.7 | 5.3 |

The values of the Curie temperature and entropy change for granules fabricated in the first run are comparable to those 15 of the reference sample fabricated by powder metal metallurgical techniques without using a binder.

In a further experiment substantially spherical brown parts containing a precursor powder mixture of $La_{1-a}R_a(Fe_{1-x-y}T_yM_x)_{13}H_z C_b$ and PPC as a binder produced by fluidized bed granulation as described above with a diameter of 1.2 to 1.5 mm where plastically deformed. The precursor powder mixture contained beside some La-rich components about 50% of elemental Fe powder. The plastic deformation is done by applying a force of 10-50 N at a temperature of 60° C. which is 20 K above the glass transition temperature of PPC resulting in oblate ellipsoid shaped particles with a diameter of about 2.45 mm and a thickness of about 0.6 mm.

These brown parts have been filled into a small Teflon container. The Teflon container was rotated in a magnetic field of about 800 kA/m. The magnetic field was applied in a direction perpendicular to the rotation axis of the container. During the rotation the particles aligned themselves with their short axis parallel to the rotation axis. After the alignment the container was heated up to about 70° C. and the lid of the container was pressed parallel to the former rotation axis, which is perpendicular to the direction of the applied magnetic field. This pressing above the glass transition temperature of the binder resulted in a working component which could be removed out of the container without losing the alignment of the particles.

The brown working component was then subjected to a debinding, sintering and hydrogenation treatment as described above resulting in a finished working component with similar magneto-caloric properties like the samples shown in FIGS. 11 and 12.

The invention claimed is:

1. A method of fabricating a working component for magnetic heat exchange, comprising:
   providing at least two articles comprising a powder of a magnetocalorically active phase or a precursor powder of a magnetocalorically active phase, a binder and an elongated form with a long axis having a length 1 and a shortest axis having a length s, wherein 1≥1.5 s, wherein the binder comprises a poly (alkylene carbonate), and the magnetocalorically active phase comprises $La_{1-a}R_a(Fe_{1-x-y}T_yM_x)_{13}H_xC_b$, wherein M is Si and optionally Al, T is one or more of the elements from the group consisting of Mn, Co, Ni, Ti, V and Cr, and R is one or more of the elements from the group consisting of Ce, Nd, Y and Pr, wherein 0≤a≤0.5, 0.05≤x≤0.2, 0.003≤y≤0.2, 0≤z≤3 and 0≤b≤1.5,
   securing the at least two articles relative to one another in a position by a sintering treatment such that the shortest axes of the at least two articles are substantially parallel to one another.

2. A method according to claim 1 wherein the binder is removed before the sintering treatment by heat treating the brown body at a temperature less than 400° C. in at least one of the group consisting of a noble gas atmosphere, a hydrogen-containing atmosphere, and a vacuum.

3. A method according to claim 1 wherein the at least two articles comprise two substantially planar surfaces.

4. A method according to claim 3 wherein the at least two articles are plastically deformed at a temperature in the range of the glass transition temperature of the binder or above.

5. A method according to claim 1 wherein the at least two articles are aligned by pressing or rolling.

6. A method according to claim 1 wherein the packing density of the articles is increased by pressing.

7. A method according to claim 1 wherein the at least two articles are produced by one of the group consisting of casting, screen printing, fluidized bed granualisation, extrusion or calendaring.

8. A method according to claim 1 further comprising mixing a solvent with the binder.

9. The method according to claim 1, wherein the poly (alkylene carbonate) is one of the group consisting of poly(ethylene carbonate), poly(propylene carbonate), poly (butylene carbonate) and poly(cyclohexene carbonate).

10. The method according to claim 1, wherein the at least two articles comprise a precursor of a magnetocalorically active phase and the sintering comprises reactive sintering the at least two articles to form the magnetocalorically active phase from the precursor powder.

11. The method according to claim 10, further comprising working the working component to modify the outer dimensions of the working component.

12. The method according to claim 1, wherein the articles comprise an ellipsoid form.

13. The method according to claim 1, wherein the securing the at least two articles comprises applying an adhesive.

14. The method according to claim 13, further comprising curing the adhesive.

15. The method according to claim 1, further comprising applying a soft solder powder to the at least two articles to form a composite.

16. The method according to claim 15, wherein the securing the at least two articles comprises heating the composite to above the melting temperature of the soft solder and cooling the composite to form the working component.

17. A method of fabricating a working component for magnetic heat exchange, comprising:

mixing a solvent with a binder of poly (alkylene carbonate) and a precursor powder of a magnetocalorically active phase to form a composite, wherein the magnetocalorically active phase comprises $La_{1-a}R_a(Fe_{1-x-y}T_yM_x)_{13}H_xC_b$, wherein M is Si and optionally Al, T is one or more of the elements from the group consisting of Mn, Co, Ni, Ti, V and Cr, and R is one or more of the elements from the group consisting of Ce, Nd, Y and Pr, wherein $0 \le a \le 0.5$, $0.05 \le x \le 0.2$, $0.003 \le y \le 0.2$, $0 \le z \le 3$ and $0 \le b \le 1.5$;

casting the composite to produce at least two articles each comprising two substantially planar surfaces;

plastically deforming the at least two articles at a temperature above the glass transition temperature of the binder;

aligning the at least two articles by pressing or rolling to provide the at least two articles with an elongated form with a long axis having a length l and a shortest axis having a length s, wherein $l \ge 1.5\ s$;

removing the binder by heat treating at a temperature less than 400° C. in a hydrogen-containing atmosphere, followed by reactive sintering to form the magnetocalorically active phase from the precursor powder and securing the at least two articles relative to one another in a position such that the shortest axes of the at least two articles are substantially parallel to one another to form a working component; and modifying outer dimensions of the working component.

* * * * *